F. CUMONT.
MOTOR CONTROLLING ARRANGEMENT.
APPLICATION FILED JULY 9, 1914.

1,189,193.

Patented June 27, 1916.
2 SHEETS—SHEET 1.

Witnesses

Inventor
Fernand Cumont

UNITED STATES PATENT OFFICE.

FERNAND CUMONT, OF PARIS, FRANCE, ASSIGNOR TO SOCIÉTÉ DITE S. T. A. R. (SYSTÈME DE TRACTION AUTO-RÉGULATEUR), OF PARIS, FRANCE.

MOTOR-CONTROLLING ARRANGEMENT.

1,189,193.  Specification of Letters Patent.  Patented June 27, 1916.

Application filed July 9, 1914. Serial No. 850,047.

*To all whom it may concern:*

Be it known that I, FERNAND CUMONT, a subject of the King of the Belgians, residing at Paris, in the Republic of France, have invented certain new and useful Improvements in Motor-Controlling Arrangements, of which the following is a specification.

It is well known that the starting of direct current electric motors has been attained by inserting between the motor and the constant voltage supply mains an auxiliary machine whose electromotive force is capable of being varied gradually and reversed in such manner that the difference of potential applied to the motor can be varied from zero up to, for example, double the voltage of the supply mains, the variation and the reversal of this electromotive force being attained by hand by regulating and reversing the independent excitation of the auxiliary dynamo.

According to the present invention the variation, between limits as wide as may be desired, and the reversal of this auxiliary electromotive force is attained entirely automatically and consequently permits of the automatic starting of the motor or motors. It also allows of the regenerative action of the motors in whatever manner they may be excited.

By way of example the invention has been shown applied to traction equipment composed of two series motors and will be explained with reference to the drawings in which:—

Figures 1, 2:
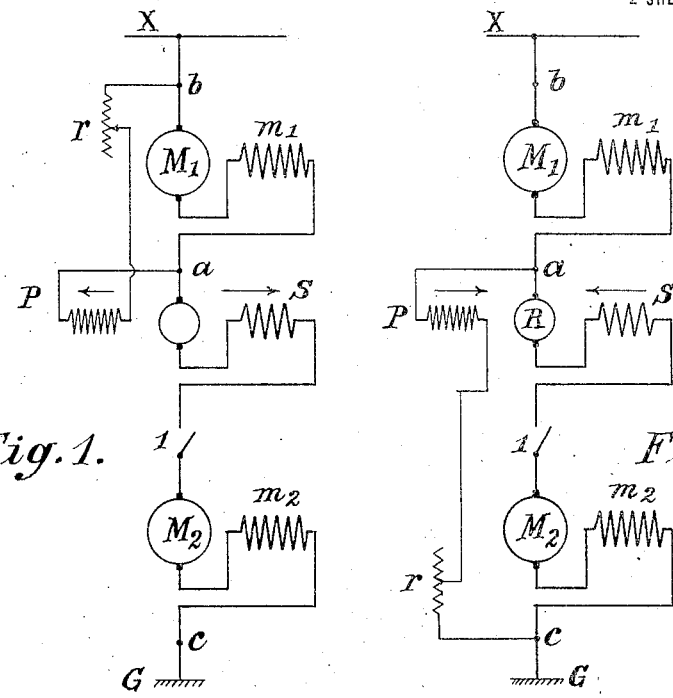
Figure 3:
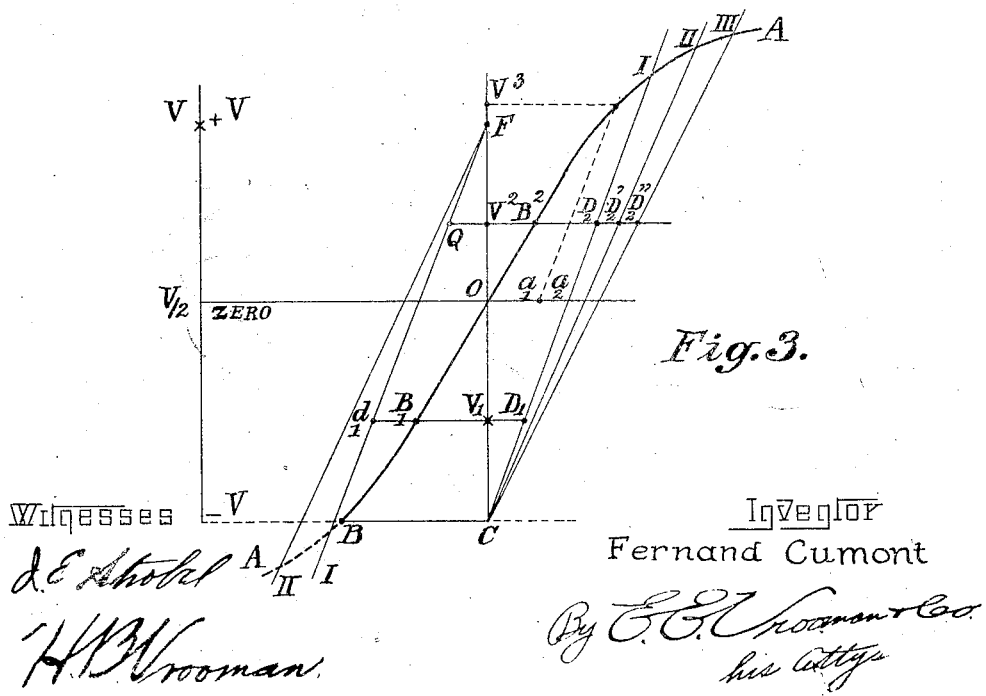
Figure 4:
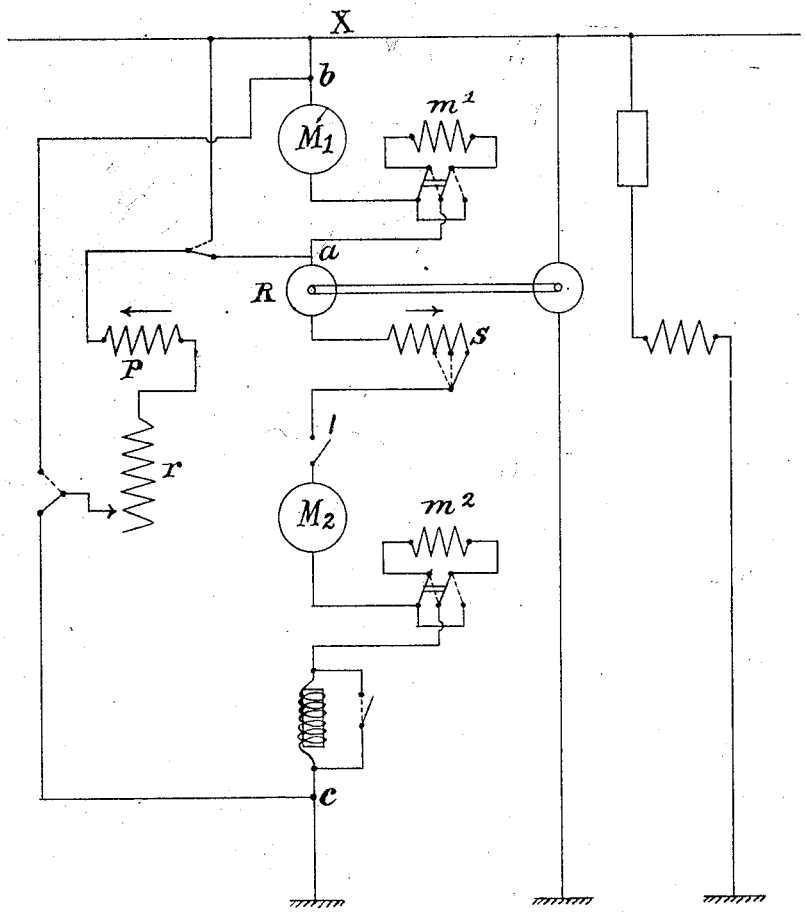

Figure 1 shows an arrangement for starting the motors automatically: Fig. 2 shows an arrangement for momentarily starting the motors without shock and for braking the motors; Fig. 3 is a diagram illustrating the operation of the arrangement. Fig. 4 shows a general diagrammatic arrangement according to the invention.

X is the supply main of constant voltage V.

G is the earth.

$M_1$ $M_2$ are the traction motors whose series windings are $m_1$ $m_2$.

R is the auxiliary machine acting as a voltage regulator.

S and P are the excitation windings of the voltage regulator, S being a series winding and the other P of fine wire is connected to the terminals of the load motor. In the actual case the two motors being situated on opposite sides of the auxiliary machine R, it is sufficient to connect this winding to the terminals of one of the motors.

It would be evident that the excitation due to this winding may be obtained equally well from two windings each of which is connected across the terminals of a motor so as to assist each other.

The two excitation windings S and P produce opposing ampere turns which act for example in the direction of the arrows.

$r$ is a regulating resistance in the circuit of the excitation P.

It will be noted that the voltage regulator has been placed between the traction motors. This arrangement is advantageous from the point of view of symmetrically isolating the two motors $M_1$ $M_2$ as regards their weight besides permitting of a simple connection of the motors $M_1$ $M_2$ in series or in parallel across the supply mains.

The phenomena which take place during the starting of the motors will first be described:—In this case the series excitation S of the voltage regulator is connected in such a manner as to produce therein an electromotive force opposite to the voltage V of the supply mains. The voltage regulator having been started and having reached its normal speed, the switch I is closed. This establishes in the circuit $M_1$, R $M_2$ a current, the intensity of which is limited by the series winding S and which reaches a value such that the ampere turns of this series excitation produce in the voltage regulator an electromotive force approximately equal to the voltage V of the supply mains, for at this moment the ampere turns produced by the fine wire excitation P are negligible. At the same time in spite of the presence of this series winding a sudden jerk will be produced at the moment of closing the interrupter 1 before the current reaches its desired value. Special precautions must therefore be taken at this moment which will be discussed later.

The law followed by the variation of current will be understood by referring to the diagram in Fig. 3 of the drawing herewith in which the abscissæ represent the excitation ampere turns of the voltage regulator and the ordinates the voltage across the terminals of this machine. On another scale the ordinates also represent the voltage across the brushes of one of the traction motors.

The curve A O A represents the magnetic characteristic of the voltage regulator which machine is more particularly used in the non-saturated part of its magnetic cycle.

The straight line C I represents the characteristic of the fine wire excitation P whose ampere turns increase proportionally with the voltage across the terminals of the motor $M_1$. The inclination of this line to the axis of the ordinates can be regulated by the rheostat $r$. On first starting the series excitation S acts alone. It ought then to give across the terminals of the voltage regulator a voltage V, the length C B will then represent the value of the ampere turns of this excitation. This series excitation can be suitably chosen in order that the current thus produced will correspond to the starting current of the traction motors which it is desired to obtain. In consequence when the motors start the voltage across their brushes goes on increasing while the voltage across the brushes of the regulating machine will first diminish to zero and then change in direction.

For a voltage equal to C V, across the brushes of the motor $M_1$, the ampere turns of the series excitation are represented by $D_1 B_1$ those of the excitation P by $V_1 D_1$ and the resultant of these two excitations consequently being $V_1 B_1$.

For a voltage equal to $C V_2$ across the brushes of the same motor the ampere turns of the series excitation are represented by $D_2 B_2$ those of the excitation P by $V_2 D_2$, the resultant of these two excitations being $V_2 B_2$. Consequently the ampere turns of the series excitation are always represented by the length of a line parallel to the axis of the abscissa lying between the magnetic characteristic of the voltage regulator and the straight line characteristic of the fine wire excitation P. This length will then serve as a measure in ampere turns of the series excitation S of the current passing through the traction motors $M_1 M_2$.

Assuming that the current through the system which corresponds to the resisting couple of the vehicle can be measured in ampere turns, for example by the length $a_1 a_2$, the acceleration will continue until the pressure across the terminals of the motors has reached the value $C V_3$ which is determined by the point where the line drawn parallel to C I through the point $a$ intersects the magnetic characteristic.

In order to change the law relating to the current variation it is sufficient to alter the value of the resistance $r$. The characteristic of the excitation P will be for example CI, CII and CIII. For any voltage $C V_2$ across the terminals of the motors the values of the current measured in ampere turns of the series excitation will be respectively $B_2 D_2$, $B'_2 D'_2$, $B_2 D''_2$. From the preceding explanation it will be understood that the current at the instant of starting is always the same whatever the value of the resistance $r$ which controls the speed regulation of the vehicle. The value of this current can be varied as desired by acting upon the series excitation S whether for example by shunting or by cutting out a number of turns.

It has been stated above that in order to avoid a jerk at starting it is necessary to take certain precautions, one method of establishing the starting current is given below by way of example.

Assuming the motors $M_1 M_2$ are at rest, the switch $l$ open, the voltage regulator running at normal speed. The terminal $b$ of the fine wire excitation is connected at $c$ thus obtaining the arrangement shown in Fig. 2 of the drawing; the resistance $r$ is given such a value that the voltage across the brushes of the voltage regulator are approximately equal and opposite to that of the line. The circuit of the motors $M_1 M_2$ can then be closed without jerking. At this instant the fine wire excitation P is broken at $c$ and the series excitation S acts alone and establishes in the circuit of the motors the starting current. It is only necessary to replace the connection of the fine wire excitation P, at $b$, that is to say according to the diagram of Fig. 1, while giving to the resistance $r$ any suitable value for attaining the desired starting.

It will be noticed that having established the starting current by the series excitation S alone if the fine wire excitation P was not replaced the current would go on diminishing and would become zero for a voltage $\frac{V}{2}$ across the terminals of the traction motors. In this manner it is possible to obtain the first stage of starting.

In order to obtain a regenerative braking action—Fig. 2 of the annexed drawings—while making the motors $M_1 M_2$ act as generators feeding into the supply mains, the connections of the field windings, $m_1 m_2$ of these motors will be first reversed in relation to their armature (this reversal is not shown in the drawing). As the direction of the current circulating in the circuit $M_1$ R $M_2$ ought to be reversed the direction of the ampere turns of the series excitation S will be reversed. The fine wire excitation will be connected to the points $a$, $c$ and will give in consequence the ampere turns of opposite sense to those produced during the starting, while the voltage across the terminals of the motors will not be greater than the voltage across the supply mains.

To establish braking conditions the resistance $r$ is given a value such that the electromotive force produced by the voltage regulator will be slightly higher than the voltage V of the supply mains, the switch $l$ being closed, the whole system $M_1$ R, $M_2$ will feed current into the supply mains. The motors $M_1$ $M_2$ acting as generators will be excited suddenly and owing to the action of the series winding S the electromotive force of the voltage regulator will go on diminishing, will reverse and will increase until it reaches a value depending on the speed of the traction motors at the moment of commencing the braking.

When the traction motors employed are series excited the establishment of braking conditions, on account of the suddenness of the phenomena and of the high value which the electromotive force across their terminals can attain to, offers very great difficulties. The braking conditions themselves are not stable and it is necessary to take special precautions in order to obtain satisfactory operation. It will be understood that the excitation P due to its high-self-induction will not respond to the variations of current as readily as the motors which in this case are acting as generators and the voltage regulator R. Because of this it is essential to employ certain precautions in order to insure that the effect of the excitation P makes itself felt on the system if anything in advance of the other field windings $m_1$ $m_2$ and S respectively. To do this various means may be employed, for instance, a self-induction coil may be placed in the motor circuit between the connections of the excitation P, or the windings of the motors may be shunted by suitably excited auxiliary dynamos. Other means for obtaining the same result are described in my co-pending applications Serial Nos. 702074, 734452 and 758212.

In the diagram of Fig. 3 the variations of current will be obtained by tracing through the point F corresponding to the voltage V the straight line $F^1$, $F^{11}$ . . . which represent the characteristics of the fine wire excitation P for different values of the resistance $r$.

The current which is established in the braking circuit and which depends on the speed of the vehicle at the moment considered as well as on the characteristic of the motors will be measured in ampere turns by the series excitation S, for example, by a length $B_2$ Q.

The speed of the motors as well as the voltage across their terminals falls immediately to that of the braking couple due to this current and the current is always measured for any voltage whatever C $V_1$, by the length $B_1$ $d$, measured along a line drawn parallel to the axis of the abscissa between the characteristic of the voltage regulator and the straight line $F^1$. This reduction of speed continues until the motor stops.

The voltage regulator R evidently operates sometimes as a motor and sometimes as a generator. The function of the machine which is coupled to it is naturally the opposite and because of the current intensity of the line is absorbed at starting and fed out during braking it restores the current so absorbed or takes in the current fed out by the voltage regulator if this machine is connected across the same supply mains X G. Without departing from the spirit of the present invention it is possible to combine in any known manner these two distinct machines into a single machine having the same properties.

If by suitable means the current passing through the fine wire winding P is broken at any instant, this winding being no longer a shunt winding, but being separately excited, a speed will be obtained which will be different to the speed corresponding to the half or full voltage. This means may be applied not only during starting, but also during braking, particularly during descents. At starting when the voltage across the terminals of the voltage regulator is nothing or when it is equal and in the same direction as that of the mains it is possible to cut this apparatus out of circuit and to couple the motors directly on to the supply mains whether in series or in parallel.

The diagrams shown in Figs. 1 and 2 are given by way of example and it will be possible to make several detailed modifications therefrom without departing from the spirit of the invention. Also the field windings $m_1$ $m_2$ of the motors may be directly connected together instead of connecting each of them to their corresponding armature. By this means a single reversing switch will be sufficient for acting upon the two motors. Also it will be understood that the system which is the object of the present invention may be applied to the starting speed regulation and braking of direct current motors whatever may be the number or method of excitation of these motors.

I declare that what I claim is:—

1. An electric system comprising in combination a motor, mains, a source of electrical energy in series with said motor across said mains, means to vary the current of said source according to the current flowing through the system, and means to vary the current of said source with the voltage across the motor terminals.

2. An electric system comprising in combination a motor, mains, a direct current dynamo electric machine connected in series with said motor across said mains, two exciting windings on said dynamo electric machine the current through one of which varies with the current flowing through the system and the current through the other of which varies with the voltage across said motor, the said excitations acting in opposition, and means for maintaining said dynamo electric machine at approximately constant speed.

3. An electric system comprising in combination a motor, mains, a dynamo electric machine connected in series with said motor across said mains, two exciting windings on said dynamo electric machine, one of which is connected in series with the motor circuit and the other is connected across the terminals of said motor in opposition to said first exciting winding, and means for driving said dynamo electric machine at constant speed.

4. An electric system comprising in combination a motor, mains, a dynamo electric machine connected in series with said motor, two exciting windings on said dynamo electric machine, one having a current flowing therethrough dependent on the current flowing through the system and the other having a current flowing therethrough dependent on the volts across the terminals of said motor, and an electric motor connected across said mains and mechanically coupled to said dynamo electric machine to insure its rotating at constant speed.

5. An electric system comprising in combination a motor, mains, a dynamo electric machine connected in series with said motor, means for exciting said dynamo electric machine comprising sources of electrical energy acting in opposition, one of which sources depends on the current flowing through the system and another of which depends on the voltage across the motor.

6. An electric system comprising in combination a motor, mains, a dynamo electric machine connected in series with said motor across said mains, exciting windings on said dynamo electric machine, the current through one of which depends on the current flowing through the system, and the current through another of which depends on the voltage across the terminals of the motor, and acts in opposition to said first named excitation, means for maintaining said dynamo electric machine at constant speed, and means for varying the current passing through said second exciting winding.

7. An electric system comprising in combination a motor, mains, a dynamo electric machine connected in series with said motor across said mains, means for exciting said dynamo electric machine comprising sources of electrical energy, the voltage of one of which depends on the current flowing through the system acting in opposition to the voltage of another of which depending on the voltage across the terminals of the motor, means for driving said motor at constant speed and means for fixing at will the voltage of said second exciting source.

8. An electric system of series traction motors comprising in combination a plurality of series motors, mains, a dynamo electric machine connected in series with said motors across said mains, an exciting winding on said dynamo electric machine the current through which is dependent on the current flowing through the system and an exciting winding on said dynamo electric machine acting in opposition to said first exciting winding, the current through which depends on the voltage across the motors, and means for driving said dynamo electric machine at constant speed.

9. An electric system comprising in combination a traction system of series motors, mains, a dynamo electric machine connected in series with said motors across said mains, an exciting winding connected in series with said motors and said dynamo electric machine across said mains, a second exciting winding carrying current in opposition to the current through said first exciting winding which is connected in series with a regulating resistance across the terminals of one of said motors and means for driving said dynamo electric machine at constant speed.

10. A regenerative system of electric traction motors, comprising in combination two series motors, mains, a dynamo electric machine connected between said motors and in series with same across the mains, an exciting winding on said dynamo electric machine in series with said motors, and said dynamo electric machine, a second exciting winding connected in series with a regulating resistance across the terminals of one of the motors, and means for driving said dynamo electric machine at constant speed.

11. An electric system comprising in combination a motor, mains, a dynamo electric machine connected in series with said motor across said mains, an exciting winding on said dynamo electric machine the current through which depends on the current flowing through the system, a second exciting winding on said dynamo electric machine, the current through which acts in opposition to said first exciting winding and depends on the voltage across the terminals of said motor, means for driving said dynamo electric machine at constant speed, and means for starting said dynamo electric machine automatically without shock.

12. An electric circuit comprising in combination a motor, mains, a dynamo electric machine connected in series with said motor across said mains, an exciting winding on said dynamo electric machine dependent on the current flowing through the system and a second exciting winding, the current through which depends on the voltage across the terminals of said motor and acts in opposition to said current through said first exciting winding, means for driving said dynamo electric machine at constant speed, and means for exciting said dynamo electric machine in such manner as to generate an electromotive force approximately equal and opposite to the voltage across the said mains so as to start motor without shock.

13. An electric system comprising in combination a motor, mains, a dynamo electric machine connected in series with said motor across said mains, an exciting winding connected in series with said dynamo electric machine and said motor in such manner as to cause said dynamo electric machine to generate a voltage in opposition to the voltage across said mains, a second exciting winding connected across the terminals of said motor, so as to be excited in the opposite direction to said first exciting winding, means for driving said dynamo electric machine at constant speed, and means for connecting when starting said second exciting winding across the dynamo electric machine, in such manner as to generate an electromotive force approximately equal to the voltage across the mains and means for switching said second exciting winding across the terminals of said motor after the motor has commenced to rotate.

14. An electric system comprising in combination two series motors, mains, a dynamo electric machine connected in series with and between said motors across the mains, an exciting winding in series with said motor and said dynamo electric machine, a second exciting winding one terminal of which is connected to one terminal of the dynamo electric machine and the other connected to a regulating resistance, means for driving said dynamo electric machine at approximately constant speed, and switching means for connecting the other terminal of said regulating resistance to the mains at the opposite side of said dynamo electric machine on starting and for connecting said terminal to the other main after starting has commenced.

15. An electric system comprising in combination two series motors, mains, a dynamo electric machine in series with said motor across said mains, an exciting winding on said dynamo electric machine, the current through which varies with the current flowing through the system, a second exciting winding, means for connecting said second exciting winding with a regulating resistance across the terminals of the dynamo electric machine and one of the motors in series, to establish braking conditions, and means for driving said dynamo electric machine at approximately constant speed.

16. An electric system comprising in combination a motor, mains, a dynamo electric machine connected in series with said motor across said mains, an exciting winding the current through which depends on the current flowing through the circuit, a second exciting winding the current through which depends on the voltage across the terminals of said motor, and acts in opposition to said first exciting winding, means for driving said dynamo electric machine at approximately constant speed, and means for preventing an excessive rise of current in the system while establishing braking conditions.

17. An electric system comprising in combination two series motors, mains, a dynamo electric machine placed in series with and between said series motors across the mains, an exciting winding, the current through which depends on the current flowing through said motors, and a second exciting winding opposed to said first exciting winding the current through which depends on the voltage across the terminals of one of said motors, means for driving said dynamo electric machine at constant speed, and means for preventing an excessive rise of current in the system on the establishment of braking conditions.

18. An electric system comprising in combination a motor, mains, a dynamo electric machine connected in series with said motor across said mains, an exciting winding in series with said motors on said dynamo electric machine, a second exciting winding on said dynamo electric machine connected across the terminals of said motor, and acting in opposition to said first exciting winding, means for driving said dynamo electric machine at constant speed and means for varying the starting ampere turns of the series excitation of said dynamo electric machine.

19. An electric system comprising in combination a motor, mains, a dynamo electric machine connected in series with said motor across said mains, an exciting winding dependent on the current flowing through the system, a second exciting winding on said dynamo electric machine in opposition to said first winding, the current through which depends on the voltage across the terminals of said motor, means for driving said dynamo electric machine at constant speed, and means for varying the starting ampere turns of said first exciting winding of said dynamo electric machine.

20. An electric system comprising in combination a motor, mains, a dynamo electric machine connected in series with said motor across said mains, an exciting winding the current through which is proportional to the current flowing through the dynamo electric machine, a second exciting winding the current of which is proportional to the voltage across said motor, and means for driving said machine at constant speed.

21. An electric system comprising in combination a motor or motors, mains, a dynamo electric machine connected in series with said motor or motors across said mains, means for driving said machine at constant speed, an exciting winding on said machine, excited by the main current, a second exciting winding, means for connecting said second exciting winding across the terminals of one or more of said motors when starting and means for connecting said second exciting winding across the terminals of said dynamo electric machine and at least one of said motors in series when braking.

In witness whereof, I have hereunto signed my name this 19th day of June, 1914, in the presence of two subscribing witnesses.

FERNAND CUMONT.

Witnesses:
CHAS. P. PRESSLY,
ALPHONSE MÉJEAN.